May 14, 1963  J. J. BOGERT  3,089,381
INSPECTION EQUIPMENT
Filed May 8, 1959  2 Sheets-Sheet 2

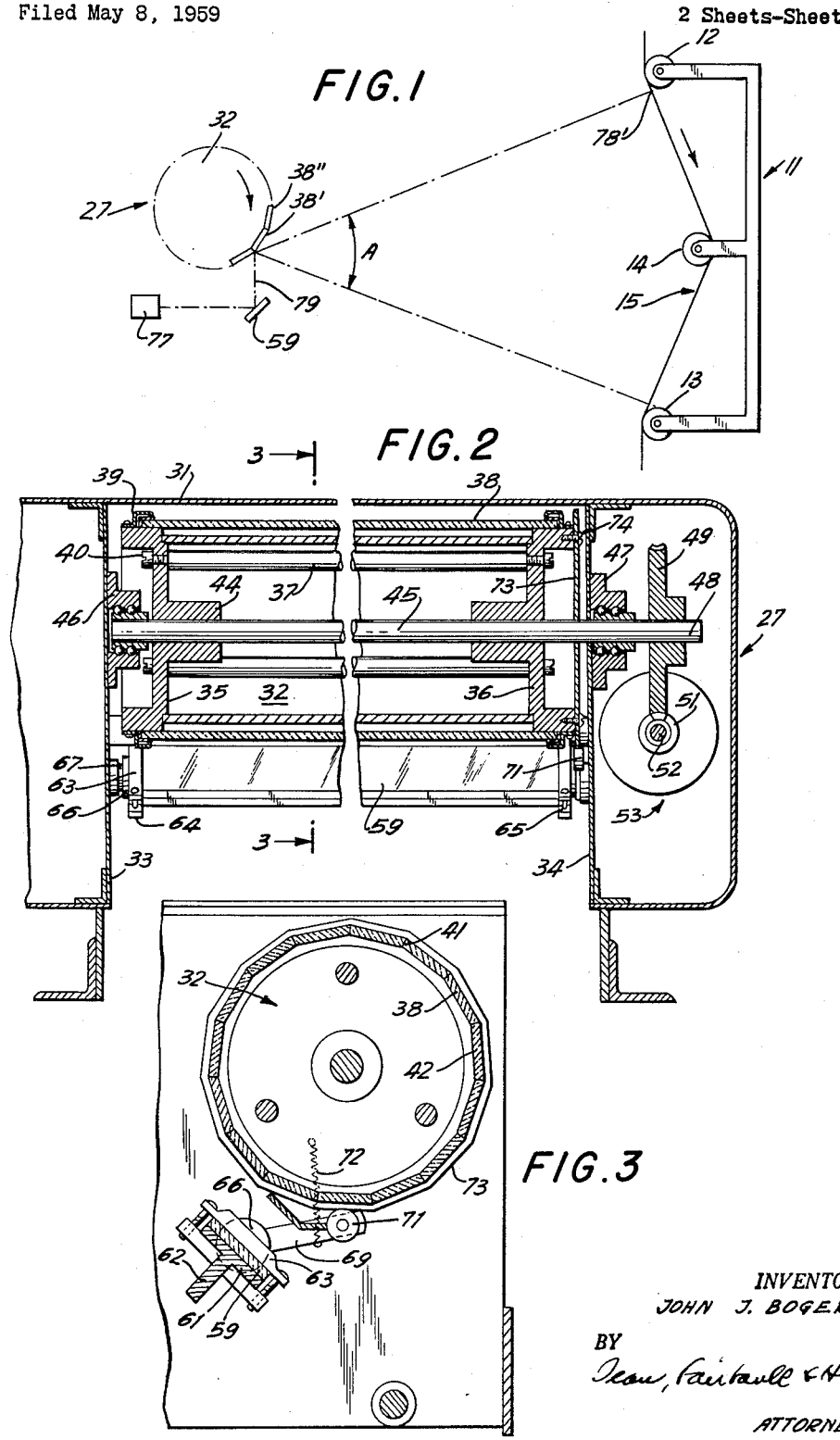

INVENTOR.
JOHN J. BOGERT
BY
Dean, Fairbanks & Hirsch
ATTORNEYS

United States Patent Office 3,089,381
Patented May 14, 1963

3,089,381
INSPECTION EQUIPMENT

John J. Bogert, Wyckoff, N.J., assignor to National Laboratories and Manufacturing Corporation, a corporation of New Jersey
Filed May 8, 1959, Ser. No. 812,044
7 Claims. (Cl. 88—14)

This invention relates to the art of inspection equipment, for observing repeated patterns or designs on a moving web.

As conducive to an understanding of the invention it is noted that in printing processes where the printed web is rewound into a roll, it is desirable that an inspection be made of the alignment and registration of the printed impression before rewinding and when the web is traveling at high speed, such inspection is impossible by direct observation of the moving web.

Where successive marks or impressions on the printed and running web are reflected to a stationary viewpoint by a suitable rotary reflecting mirror which is moved in synchronization with the running web so that said marks or impressions will appear stationary, close inspection of the web is afforded. Equipment to accomplish such purpose may be of the type shown in Patent No. 2,686,453 which permits inspection of a web moving in a straight line.

In the application of the rotating mirror to view material such as a web moving in a straight line an inherent visual error is incurred as the sight lines impinge on the web at varying angles during the scanning travel. Thus the viewed image appears to both tilt and move toward and away from the observer and this makes viewing for any long periods of time extremely tiresome and hence results in reduction of the efficiency of the inspection.

It is accordingly among the objects of the invention to provide an inspection equipment which is simple to operate and which has relatively few parts, none of which is likely to become out of order and with which an observer may view the reflected image of a portion of rapidly moving web, which portion will be maintained in apparently stationary position for sufficient time for accurate inspection thereof and with a minimum of tilting or movement of the viewed portion.

According to the invention these objects are accomplished by the arrangement and combination of elements hereinafter described and particularly recited in the claim.

In the accompanying drawings in which are shown one or more various possible embodiments of the several features of the invention, FIG. 1 is a diagrammatic side elevational view of the equipment according to one embodiment thereof.

FIG. 2 is a transverse sectional view of the rotating drum,

FIG. 3 is a sectional view taken along line 3—3 of FIG. 2,

Figure 4A:
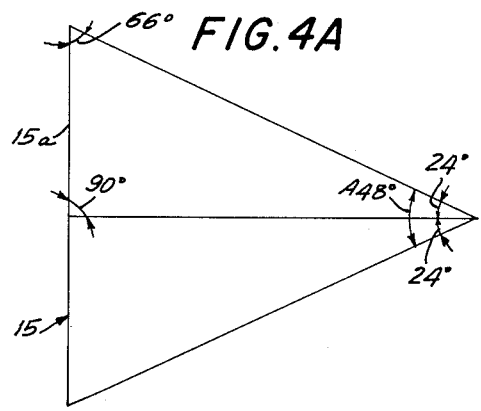
Figure 5:
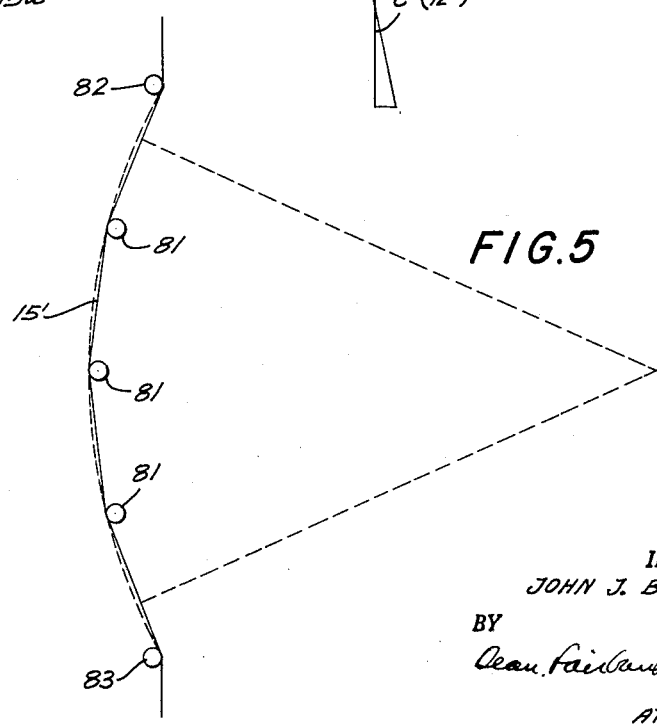

FIGS. 4A, B, C and D are diagrammatic views illustrating the tilting movement of the viewed image and, FIG. 5 is a view similar to FIG. 1 of another embodiment of the invention.

Referring now to the drawings as shown in FIG. 1, the equipment comprises a supporting frame 11 on which is mounted an upper and lower horizontal roller 12 and 13 as well as an intermediate horizontal roller 14 located midway between said rollers 12 and 13 and in a plane laterally displaced from a vertical plane extending through said rollers 12 and 13.

The rollers 12, 13 and 14 serve as a guide for a continuous strip on web 15 which rides around one side of the roller 14 and the other sides of the rollers 12 and 13 to form an obtuse angle.

Mounted in front of the frame and the web so as to face the latter is a scanning unit 27 which may be of the type shown in Patent No. 2,686,453. This unit comprises a housing 31 which contains a drum 32 extending longitudinal thereof and rotatably mounted between the spaced upright side walls 33, 34 of the housing.

As shown in FIG. 2, the drum may comprise a pair of hubs 35 and 36 retained in spaced parallel relation by separator bars 37 held against the hub by screws 40. The drum 32 desirably carries a plurality of light reflecting surfaces or mirrors 38, which are desirably elongated flat strips of uniform length and width affixed at their ends by brackets 39 to the periphery of hubs 35 and 36.

As shown in FIG. 3, the adjacent longitudinal edges 41 of the mirror 38 are desirably beveled and are retained in edge-to-edge abutment. The periphery of the hubs 35 and 36 desirably have a plurality of flats 42 thereon against which the associated ends of the mirrors may rest, the mirrors thereby forming a regular polygon in cross section.

Means are desirably provided to rotate the drum 32 in synchronization with the movement of the web 15. To this end, each of the hubs 35 and 36 desirably has an axial hub 44 affixed as by set screws (not shown), to a shaft 45 which extends therethrough. The shaft 45 is desirably journalled at one end in a bearing block 46 affixed to the inner surface of wall 33 and near its other end in a bearing block 47 affixed to the outer surface of wall 34.

The end 48 of shaft 45, which extends through bearing block 47, desirably has a worm gear 49 affixed thereon which meshes with a worm 51 affixed on the drive shaft 52 of a Selsyn motor 53 mounted on the outer surface of wall 34 (FIG. 2).

The Selsyn motor 53 is electrically connected in conventional manner to a driving Selsyn motor (not shown) which is driven in timed relation with the drive for web 15 so that upon rotation of the rotor of the driving Selsyn motor, the rotor of the driven Selsyn motor 53 will be rotated a corresponding amount.

In order to view the impressions reflected from the web 15 to the mirrors 38 in the manner hereinafter to be described, a mirror 59 is desirably provided, which, as shown in FIGS. 2 and 3, is preferably an elongated strip extending parallel to drum 32 and mounted between side walls 33 and 34 so as to oscillate or rock back and forth to maintain unaltered the optical relationship between the moving web area being viewed and the reflected image projected to the observer.

As shown in FIGS. 2 and 3, the mirror 59 is clamped to a rigid strip 61, preferably of metal, having a longitudinal reinforcing rib 62 on the underface thereof. The clamping is desirably effected by means of clamp bars 63, 64, extending transversely across the mirror 59 at its ends, said clamp bars being retained together as by screws 65. Each of the clamp bars desirably has a hub 66 affixed thereto on the outer surface thereof so that the axis of each of the hubs is aligned with the top surface of the mirror 59 midway between its side edge. The mirror 59 is mounted between the side plates 33 and 34 by means of bearing pins 67, rigidly affixed to said plates and extending laterally inward therefrom through the hubs 66 of the clamp bars 63 and is desirably rocked by a lever 69 (FIG. 3), one end of which is affixed to hub 66 while the other end carries a cam roller 71 resiliently retained as by a coil spring 72 in engagement with the periphery of a cam 73 affixed by screws 74 to hub 36.

As both the mirror 38 on the drum 32 and the oscillating mirror 59 extend the entire width of the web 15, it is apparent that such entire width will be reflected so that it may be seen by an observer viewing mirror 59 through an eye piece 77.

With the construction thus described, it is apparent that with the drum 32 at a predetermined distance from the moving web 15, as shown in FIG. 1, one of the mirrors, i.e., mirror 38' will reflect the area on the web portion 24 indicated at 78'. The image from area 78' will be reflected from mirror 38' to mirror 59 so that it can be seen by the observer through eye piece 77.

As the drum 32 rotates in a clockwise direction and the web 15 moves in the direction of the arrow, the mirror 38' will follow area 78' until such mirror 38 moves past the line of sight 79 from reflector means 59, at which time the beginning of the next mirror 38'' comes into the line of sight 79 of eye piece 77.

As successive identical patterns on the web are equidistantly spaced thereon by an amount which will bring one pattern into sight immediately after the preceding observed pattern passes out of sight, the observer will see what is apparently a stationary object.

Since the web is bent as shown in FIG. 1, as the area 78' thereon reflected by the mirrors, moves from one extreme of the region of the web bounded by the scanning angle A to the other, it is apparent that the image will appear to tilt out only a fraction of that which would occur with a straight web. The path of the running web in the area bounded by the scanning angle A is referred to as the observable path herein for convenience.

This is clearly shown in FIGS. 4A, B, C, and D.

Figure 4C:
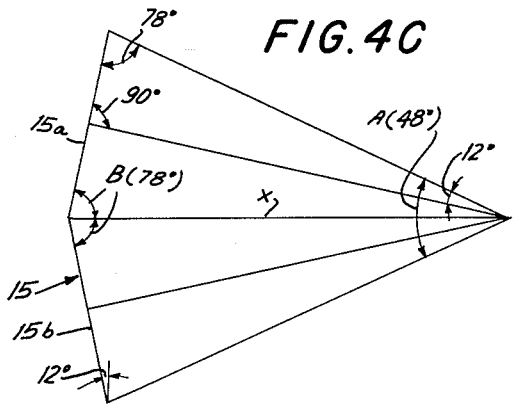
Figure 4B:
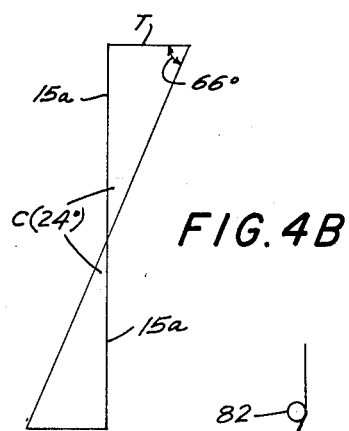

Thus assuming that the scanning angle A is 48 degrees to cover one repeated pattern, with a straight web as shown in 4A, the viewed image would tilt 24 degrees (90—66) on each side of the horizontal, such tilting angle being illustratively shown in FIG. 4B at C.

Figure 4D:
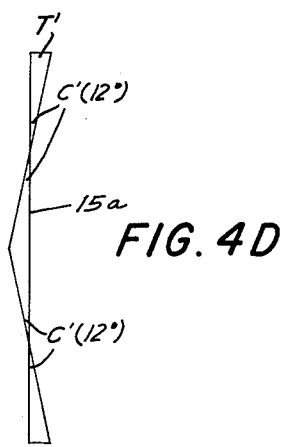

With the bent web of applicant in which, as shown in FIG. 4C, the horizontal line X desirably bisects the portion of the web 15 encompassed by the scanning angle A of 48 degrees and the angle B defined between the horizontal line X and each adjacent portion 15a, 15b' of the web is 78 degrees, the viewed image would tilt 12° (90—78) on each side of the horizontal and in both direction on each side, such tilting being illustratively shown in FIG. 4D at C'.

Assuming that the web portion 15a in FIG. 4A has a length of 1 inch angle C equal to 24 degrees then the leg T or amplitude of tilt would be $$\text{Tan. 24 degrees} = \frac{T}{1}$$

$$.4452 = \frac{T}{1}$$

$$T = .4452$$

With the web portion 15a of applicant's construction shown in FIG. 4D having a length of .51 with angle C' equal to 12 degrees, then the leg T' or amplitude of tilt would be $$\text{Tan. 12 degrees} = \frac{T'}{.51}$$

$$.2126 = \frac{T'}{.51}$$

$$T' = .1084$$

Thus T' equals .1084 approximately one quarter of T which equals .4452.

Although the roller 14 would interfere with the image on the web as the latter advanced, since it is advancing at a relatively high rate of speed, such interference would not be noticable.

It is also to be noted that regardless of the length of the repeat pattern on the web, the same positioning of the rollers 12, 13 and 14 can be used, the only adjustment required being that of the distance of the scanning unit from the web.

In the embodiment shown in FIG. 5, the web 15 is guided around a plurality of rollers 81 positioned between rollers 82 and 83 which extend in a vertical plane and laterally displaced from said rollers 82, 83.

Thus the web is traversing a path which more nearly approaches a curved path, of radius equal to the distance from the drum, than the path followed by the web of FIG. 1. Since the perfect path would be such curved path in which no tilting would occur, the web path of FIG. 5 would provide less tilt than that of FIG. 1.

However, the arrangement shown in FIG. 5 is only suitable where the repeat patterns are a given distance apart, i.e., with a printing roller of a given diameter.

If the diameter of the printing roller should be changed then the arrangement of the rollers 81 would also have to be changed to produce the desired effect.

As changes could be made in the above construction, and many different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Means for observing an image of successive impressions equidistantly spaced on a printed web comprising two spaced-apart guide means over which the web is trained, a third guide means intermediate said two spaced-apart guide means behind which said web passes to bend said web symmetrically on each side of the mid-point of its observable path to form two straight paths for said web, said guide means engaging said web at only relatively small portions of its observable path, a rotatable member having a plurality of light-reflecting surfaces successively presented by its rotary movement to receive and reflect successive light rays from the moving impressions on the straight surfaces of the web during their movement throughout the observable path, means for rotating said rotatable member in timed relation with the running web, whereby when the light rays reflected by the rotatable member are viewed, the impressions on the printed web will appear substantially stationary.

2. The combination set forth in claim 1 in which the length of said observable path is defined by a pre-determined angle with respect to said rotatable member, the angle defined between the straight paths on each side of the mid-point of said observable path being such that lines bisecting each half of said predetermined angle and extending to the mid-point of each of said straight paths forms a right angle with respect to the latter.

3. An apparatus for inspecting successive impressions on a running web of material having an observable path comprising at least three spaced-apart guide members over which the web is trained, means for supporting said guide members, one of said guide members being mounted intermediate the other two guide members to transversely engage and extend the full width of the web at the mid-point of the observable path so that the web follows two symmetrical straight line paths, a rotatable member having a plurality of light-reflecting surfaces successively presented by rotary movement to reflect successive light rays from the moving impressions on the straight surfaces of the web during mobement throughout the observable path, means for rotating said rotatable member in timed relation with the running web, whereby when the light rays reflected by the rotatable member are viewed, the impressions on the running web appear substantially stationary.

4. An apparatus for inspecting successive impressions on a running web of material having an observable path comprising at least three spaced-apart guide rollers, means for supporting said guide rollers over which the web is trained, one of said guide rollers being mounted intermediate the other two rollers and transversely to the web to engage the web at the mid-point of the observable path so that the web follows two symmetrical straight line paths, a rotatable member having a plurality of light-reflecting surfaces successively presented by rotary movement to reflect successive light rays from the moving impressions on the straight surfaces of the web during movement throughout the observable path, means for rotating said rotatable member in timed relation with the running web, whereby when the light rays reflected by the rotatable member are viewed, the impressions on the running web appear substantially stationary.

5. An apparatus for inspecting successive impressions on a running web of material having an observable path comprising a plurality of guide rollers mounted transversely to the path of movement of the web in spaced-apart relation and engaging the web so that the web follows two symmetrical straight line paths, there being one of said rollers engaging the front of the web at the mid-point of the observable path, means for supporting said rollers, a rotatable member having a plurality of light-reflecting surfaces successively presented by rotary movement to reflect successive light rays from the moving impressions on the straight surfaces of the web during movement throughout the observable path, means for rotating said rotatable member in timed relation with the running web, whereby when the light rays reflected by the rotatable member are viewed, the impressions on the printed web appear substantially stationary.

6. An apparatus for insptcting successive impressions on a running web of material having an observable path, including a plurality of light-reflecting surfaces, means for moving said reflecting surfaces in timed relation to said running web whereby when the light rays reflected by said reflecting surfaces are viewed the impressions on the running web appear substantially stationary and guide means over which the web is trained including at least three spaced-apart guide members, one of which is located intermediate said reflecting surfaces and the running web and transversely engaging the web at the mid-point of the observable path so that the web follows two symmetrical straight line paths, and means for supporting said guide members in said spaced-apart relationship.

7. An apparatus for inspecting successive impressions on a running web of material having an observable path including a plurality of light-reflecting surfaces, means for moving said reflecting surfaces in timed relation to the running web whereby when the light rays reflected by said reflecting surfaces are viewed the impressions on the running web appear substantially stationary and guide means over which the web is trained including at least three spaced-apart rollers, one of said rollers being located intermediate said reflecting surfaces and the running web for transversely engaging the web at the mid-point of the observable path so that the web passes behind said one guide roller and follows two symmetrical straight line paths, means for supporting said rollers in said spaced-apart relationship.

References Cited in the file of this patent

UNITED STATES PATENTS

| | | |
|---|---|---|
| 1,283,577 | Sloman | Nov. 5, 1918 |
| 1,963,485 | Manifold et al. | June 19, 1934 |
| 2,124,802 | Wallace | July 26, 1938 |
| 2,626,535 | Owen et al. | Jan. 27, 1953 |
| 2,686,453 | Bogert | Aug. 17, 1954 |
| 2,746,749 | Huck | May 22, 1956 |

FOREIGN PATENTS

| | | |
|---|---|---|
| 493,641 | Germany | Mar. 11, 1930 |